United States Patent [19]
Thompson

[11] 3,911,682
[45] Oct. 14, 1975

[54] THERMAL ACTUATOR

[75] Inventor: Paige W. Thompson, Morrison, Ill.

[73] Assignee: General Electric Company, Fort Wayne, Ind.

[22] Filed: June 28, 1974

[21] Appl. No.: 484,282

[52] U.S. Cl. ............... 60/531; 73/368.4; 236/68 A
[51] Int. Cl.² .......................................... F03G 7/06
[58] Field of Search ...... 60/531, 528; 236/68, 68 A; 73/368.4, 368

[56] References Cited
UNITED STATES PATENTS

| | | | |
|---|---|---|---|
| 896,526 | 8/1908 | Fournier | 73/368.4 |
| 997,188 | 7/1911 | Fournier | 73/368.4 |
| 2,147,695 | 2/1939 | Folds | 60/531 |

FOREIGN PATENTS OR APPLICATIONS 1,164,146  12/1958  France .............................. 73/368.4

Primary Examiner—Martin P. Schwadron
Assistant Examiner—H. Burks, Sr.
Attorney, Agent, or Firm—Joseph E. Papin

[57] ABSTRACT

A thermal actuator has means for accomplishing work, and a pair of means for containing vaporizable fluid are operable to respectively apply at least a portion of the vaporizable fluid contained therein to the accomplishing means to effect the work thereof.

Methods of operating a thermal actuator, actuating systems for a thermal actuator, and electrical circuits for controlling a thermal actuator are also disclosed.

50 Claims, 4 Drawing Figures

THERMAL ACTUATOR

CROSS REFERENCE TO RELATED APPLICATIONS

This application for patent is related to copending applications Ser. Nos. 439,894 and 439,895 filed Feb. 6, 1974 and to copending application Ser. No. 473,764 filed May 28, 1974. These copending applications for patent are specifically incorporated herein by reference.

BACKROUND OF THE INVENTION

This invention relates generally to thermal controls and in particular to a thermal actuator, methods of operating a thermal actuator, actuating systems for a thermal actuator, and an electrical circuit for controlling a thermal actuator.

In the past, various types of thermal actuators have been utilized in different actuating systems and controlled by different electrical circuits. One of the disadvantageous or undesirable features of some of the past thermal actuators, actuating systems and electrical circuits therefor was that they operated too quickly, i.e. from the time heating of the thermal actuator commenced until it operated its driven device. Another of the disadvantageous or undesirable feature of some of the past thermal actuators, actuating systems and electrical circuits therefor was that they did not provide a time delay between the time heating of the thermal actuator commenced until it operated its driven device. Still another of the disadvantageous or undesirable feature of some of the past thermal actuators, actuating systems and electrical circuits therefor was that their utility was limited since only one boiler was available for effecting actuation of the driven device by the thermal actuator. And yet another disadvantageous or undersirable feature of some of the past thermal actuators, actuating systems and electrical circuits therefor was that the thermal actuator could not be partially actuated for a period of time and then quickly operated by the addition of a relatively small amount of work or pressure to effect accurate actuation of its driven device. Another disadvantageous or undesirable feature of some of the past thermal actuators, actuating systems and electrical circuits therefor was their inability to quickly respond to a low voltage, power loss, or other emergency situations. In these emergency situations, the driven devices, which constituted loads, either stayed on the line or, if taken off the line, came back on it too quickly thereby to oppose the restoring of power.

SUMMARY OF THE INVENTION

Among the several objects of the present invention may be noted the provision of a thermal actuator, methods of operating a thermal actuator, actuating systems for a thermal actuator, and an electrical circuit for operating a thermal actuator which overcome the disadvantageous or undesirable features discussed hereinabove, as well as others, with respect to the past devices; the provision of such thermal actuator, methods, systems, and circuits in which plural sources of a vaporizable fluid are selectively controlled for driving a driven device; the provision of such thermal actuator, methods, systems and circuits in which a time delay may be provided during the "on" cycle or heating period of the thermal actuator; and the provision of such thermal actuator, methods, systems, and circuits for operating such which are simplistic in design, economical to manufacture, and easily assembled.

In general, a thermal actuator in one form of the invention has means for performing work in response to vaporizable fluid applied thereto, and a pair of means for containing vaporizable fluid are operable generally sequentially to respectively apply at least a portion of the vaporizable fluid contained therein to the performing means to establish the work thereof. The application of the evaporizable fluid from one of the containing means to the performing means is effective to establish the work thereof at an amount less than a predetermined value, and the application of the vaporizable fluid from the other of the containing means to the performing means is effective to increase the work thereof to an amount at least as great as the predetermined value.

Also in general, a thermal actuator in one form of the invention has means for performing work in response to a vaporizable fluid applied thereto, and a pair of means for containing the vaporizable fluid are operable generally sequentially to respectively apply the vaporizable fluid to the performing means to effect the work thereof. One of the containing means is operable generally to apply its entire volume of the vaporizable fluid to the performing means to establish the work thereof at an amount less than a predetermined value, and the other of the containing means is subsequently operable generally to apply at least a portion of its volume of the vaporizable fluid to the performing means to increase the work thereof to an amount at least as great as the predetermined value.

More particularly and also in one form of the invention, a thermal actuator is provided with a pair of boilers for a vaporizable fluid, and one of the boilers is adapted to contain a predetermined volume of the fluid while the other of the boilers is adapted to contain a volume of fluid less than the predetermined volume. A bellows having an expansible chamber therein for the fluid is operable generally for performing work, and a pair of conduits are respectively interconnected between the boilers and the expansible chamber for transferring the fluid therebetween. A pair of heaters are disposed in heat transfer relation with the boilers and are adapted to be energized upon the occurrence of certain conditions for heating the boilers to at least the vaporization temperature of the fluid, respectively. One of the heaters is energized upon the occurrence of one of the certain conditions to heat the one boiler vaporizing generally the entire predetermined volume of the fluid therein and effecting the transfer thereof through one of the conduits into expansible chamber for operating the bellows to effect the work thereof. The other of the heaters is subsequently energized upon the occurrence of another of the certain conditions to heat the other boiler vaporizing at least a portion of the fluid therein and effecting the transfer of fluid therefrom through the other of at least another portion of the the conduits into the expansible chamber for further operating the bellows to increase the work thereof.

In general, a method in one form of the invention is provided for operating a thermal actuator. In this method, means adapted to be operated by a vaporizable fluid is partially actuated so as to transmit an output force by applying the fluid under a first pressure from a source thereof to act on the operated means and establish the output force at a value less than a predetermined value. The actuation of the operated means is thereafter completed by applying the fluid under a second pressure from another source thereof to act on the operated means and supplementing the first pressure with the second pressure to increase the output force to a value at least as great as the predetermined value.

Also in general and in one form of the invention, another method is provided for operating a thermal actuator having a vaporizable fluid therein. In this operating method, the fluid in each of a pair of supply means therefor is communicated with the fluid in means adapted to be operated thereby. The operated means is supplied an initial selected volume of the fluid from one of the supply means less than that necessary for effecting the complete operation of the operated means. The initial selected volume of the fluid supplied to the operated means is then supplemented with an additional volume of the fluid from the other of the supply means to the operated means, and the additional volume is at least great enough for effecting the completion of the operation of the operated means.

Further in general, an actuating system in one form of the invention has a device adapted to be driven to an actuated position. A thermal actuator containing a vaporizable fluid includes means operable generally to perform work for driving the driven device, and means for effecting partial operation of the driving means to initially perform its work in an amount less than a predetermined value to effect at least a partial driving of the driven device to its operable position. Also included is means for effecting supplemental work by the driving means in an amount, which when additive to its initial work, is at least as great as the predetermined value to complete the driving of the driven device to the actuated position thereof.

More particularly and still in general, another actuating system in one form of the invention has a driven device adapted to be sequentially driven from a generally at-rest position to a poised position and therefrom toward a completely actuated position. Means is responsive to a vaporizable fluid applied thereto for driving the driven device. A pair of means having the fluid therein are connected in generally open fluid communication with the driving means and are operable generally sequentially for applying the fluid to the driving means to effect its actuation and its driving of the driven device. The driving means is responsive to the fluid initially applied thereto from one of the applying means to drive the driven means between its generally at-rest position and its poised position, and the driving means is thereafter further responsive to the fluid applied thereto from the other of the applying means to drive the driven means from its poised position to at least its completely actuated position.

In general and also in one form of the invention, an electrical circuit is provided for controlling a pair of heaters for effecting heating and cooling of a pair of boilers for vaporized fluid in a thermal actuator. In this circuit, means is operable for applying power to energize one of the heaters for heating one of the boilers and vaporizing the fluid therein, and other means is provided for applying power to energize the other of the heaters for heating the other of the boilers and vaporizing the fluid therein upon the occurrence of a certain condition. Means is operable generally in response to the vaporization of the fluids in the first named and other boilers for switching the first named power applying means into series circuit relation with the second named power applying means, and the second named power applying means also is operable, upon the occurrence of another certain condition, to interrupt the enerization of the heaters thereby to effect cooling of the boilers.

BRIEF DESCRIPTION OF THE DRAWINGS

Corresponding reference characters indicate corresponding parts throughout the several views of the drawing.

The following examples illustrate the invention in one form thereof and are not to be construed as limiting in any manner.

DETAILED DESCRIPTION OF THE PREFERRED EMBODIMENTS

Figure 1:
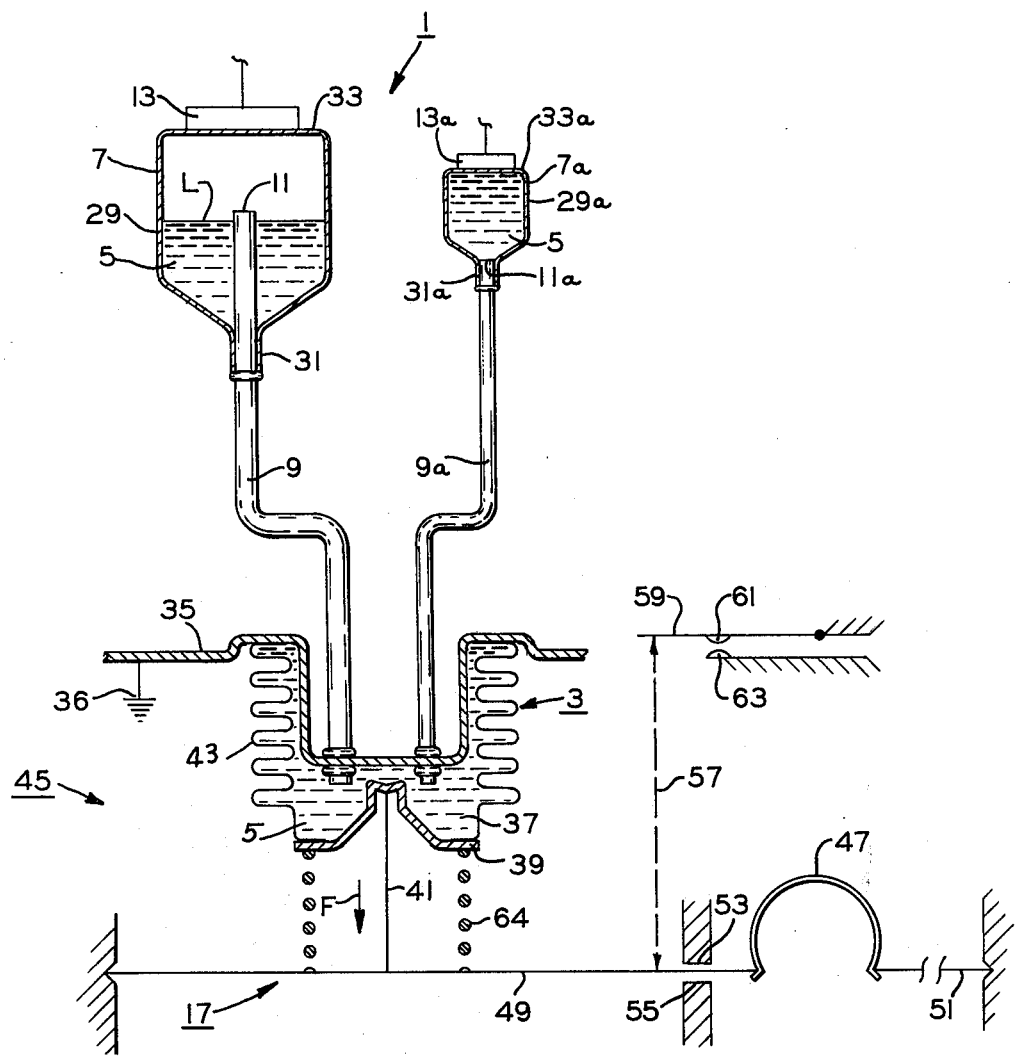
FIG. 1 is a schematic view showing a thermal actuator, an actuating system for the thermal actuator, and an electrical circuit for operating the thermal actuator, each illustrating one form of the invention and teaching principles of a method of operating a thermal actuator also in one form of the invention.
Figure 2:
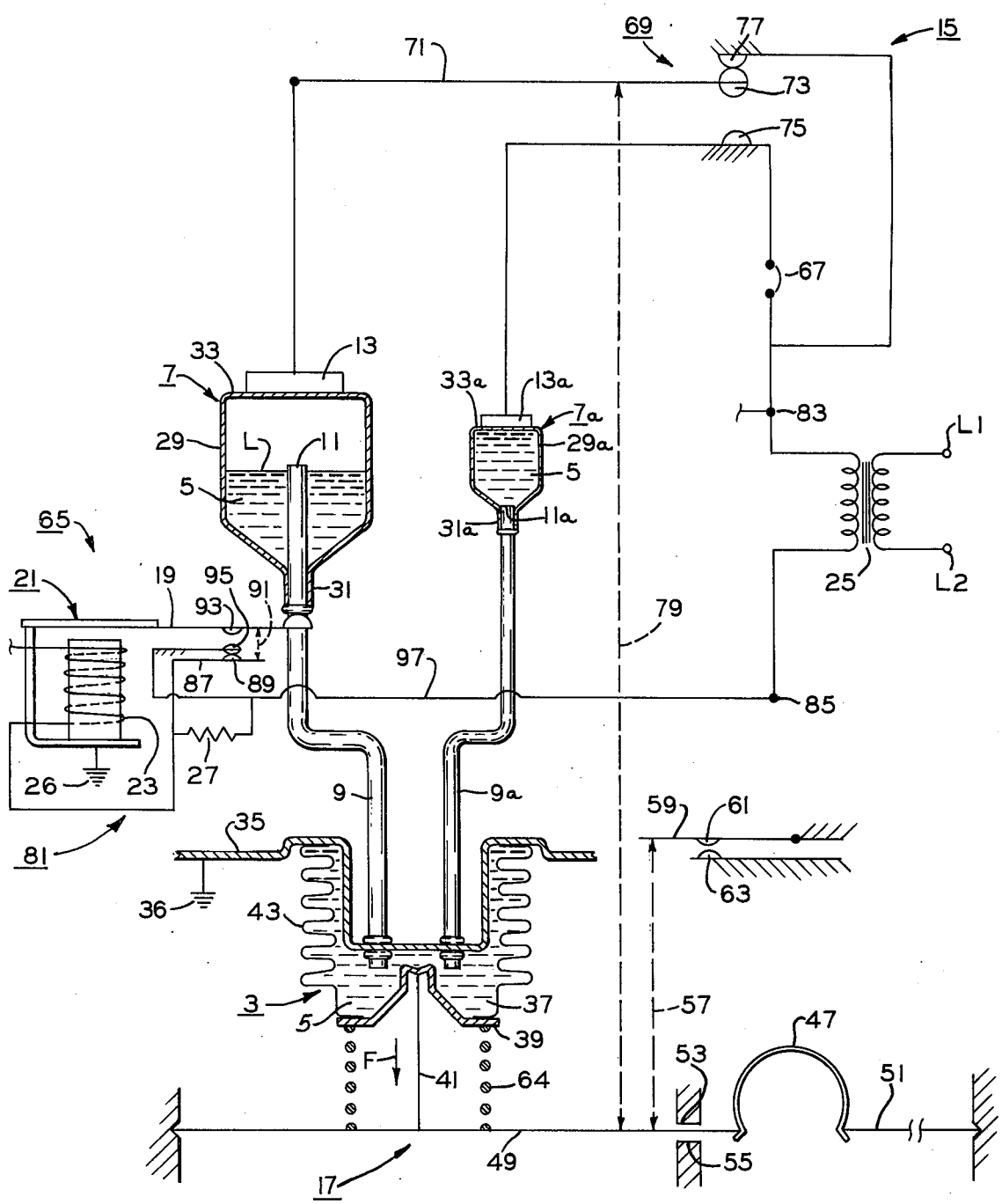
FIG. 2 is also a schematic view showing an alternative actuating system and electrical circuit for the thermal actuator of FIG. 1, each illustrating one form of the invention and also teaching principles of an alternative method of operating a thermal actuator also in one form of the invention.

Referring now to the drawings in general, there is illustrated a method in one form of the invention for operating a thermal actuator indicated generally at 1 (FIGS. 1 and 2). In this method, means, such as an expansible member or bellows 3, is at least partially actuated by a vaporizable fluid 5 provided from a source thereof, such as a boiler or bulb 7 of thermal actuator 1. Actuation of bellows 3 is thereafter completed by providing it with fluid 5 from another source, such as another boiler or bulb 7a of thermal actuator 1.

More particularly and with reference to FIG. 1, a pair of means, such as conduits or tubes 9, 9a or the like, for transferring or applying fluid 5 is disposed between boilers 7, 7a and bellows 3 thereby to communicate them at all times. A pair of upper or open end portions or openings 11, 11a are provided in conduits 9, 9a within boilers 7, 7a, and upper end portion 11 extends farther into its boiler than does upper end portion 11a. While boiler 7a is generally filled with fluid 5 in its liquid state, fill level L of the fluid in its liquid state in boiler 7 is less than the capacity thereof and preferrably beneath upper end portion 11 of conduit 9 or generally coextensive therewith. It may be noted that fluid in its liquid state in boiler 7 constitutes a predetermined volume or amount, as discussed further hereinafter; therefore, fill level L and the distance upper end portion 11 extends into boiler 7 are correlative to the predetermined volume of the fluid in its liquid state in the boiler.

Vaporization of fluid 5 in boilers 7, 7a may be accomplished by energizations of any suitable heating means conductively coupled or otherwise thermally associated with the boilers, as well known in the art, and to this end a pair of positive temperature coefficient resistors (PTCR) 13, 13a are disposed in heat transferring relation with the boilers and connected for energization in an electrical circuit, indicated generally at 15 in FIG. 2 and discussed in greater detail hereinafter. While PTCR 13 and 13a are shown and described for purposes of disclosure, it is contemplated that other means for heating boilers 7, 7a may be utilized within the scope of the invention. It may be noted that boilers 7, 7a are adapted to be heated generally sequentially; however, while such sequential heating set out for purposes of disclosure, it is also contemplated as including a situation wherein the heating of one boiler may be initiated subsequent to the heating of the other boiler. Further, the sequential heating of boilers 7, 7a is also contemplated to encompass generally simultaneous heating of the boilers, but at different heating rates, within the scope of the invention. Upon the energization of PTCR 13, boiler 7 is conductively heated at least to a temperature effecting vaporization of fluid 5 therein. Such vaporization is accompanied by a corresponding increase in pressure in boiler 7 thereby to create a pressure differential between boiler 7 and relatively cooler bellows 3. This pressure differential is effective to cause the application of the vaporized fluid in boiler 7 to bellows 3 through conduit 9, and the vaporized fluid so applied to bellows 3 condenses back to its liquid state in the relatively cooler environs of the bellows which may be generally thermally isolated from the boiler. Of course, the rate of application or transfer of fluid 5 in its vaporized state is relatively slower or less than a rate of application might be for fluid in its liquid state. Since the volume of fluid 5 in its liquid state in boiler 7 is predetermined, the time necessary or required to vaporize such predetermined volume of the fluid and apply it to bellows 3 may also be predetermined. In this manner, the predetermined volume of fluid 5 in boiler 7 may be varied to obtain a predetermined time delay for the final operation of thermal actuator 1, as discussed hereinafter. Further, the predetermined volume of fluid 5 initially so applied to bellows 3 creates a pressure which acts on the effective area of the bellows to accomplish work, as may be illustrated by movement of the bellows in response to the establishment of an output or working force F which is less than a predetermined value necessary or required to effect further or final operation or actuation of a driven device, indicated generally at 17 and discussed further hereinafter. In this manner, both bellows 3 and driven device 17 are initially at least partially operated and prepositioned, i.e. the established output force F and movement of the bellows for accomplishing its work poises the driven device for further or final actuation or operation toward an operable position thereof.

Subsequent to the operation of boiler 7 to initially pressurize bellows 3 for moving it and establishing output force F, as previously discussed, PTCR 13a may be energized to sequentially effect the further or final operation of bellows 3 and driven device 17. Upon the energization of PTCR 13a, boiler 7a is heated at least to a temperature effecting vaporization of at least a portion of fluid 5 therein. Such vaporization is accompanied by a corresponding increase in pressure in boiler 7a thereby to create a pressure differential between boiler 7a and bellows 3. The pressure so created in boiler 7a by the vapor established therein acts on the effective area of the remaining fluid 5 in its liquid state in the boiler thereby to effect relatively rapid displacement or application thereof through conduit 9a to bellows 3. As will be recalled, the rate of transferring or applying fluid 5 in its liquid state between boiler 7a and bellows 3 was previously mentioned as being greater than the application of the fluid in its vaporized state between boiler 7 and bellows 3. The pressure of liquid 5 applied in its liquid state from boiler 7a to bellows 3 may be supplemental or additive to the pressure previously established therein by operation of boiler 7. These additive pressures act on the effective area of bellows 3 to move it and increase output force F at least to the predetermined value required to accomplish the work of the bellows for further or finally actuating or operating driven device 17 to a desired operable or actuated position thereof.

During reset operation or the "off" cycle of thermal actuator 1 effected in response to the occurrence of a certain or preselected condition, PTCR 13 and PTCR 13a revert to their de-energized states to terminate heating of boilers 7, 7a which, of course, effects or engenders cooling of the boilers. As boilers 7, 7a begin to cool, slight amount of vaporized fluid 5 therein will condense which results in corresponding slight decreases of pressure in the boilers. Upon these slight decreases in pressure, pressure differentials are created between boilers 7, 7a and bellows 3, and these pressure differentials are effective to establish return flows of fluid 5 through conduits 9, 9a from the bellows to the boilers thereby to generally equalize the pressures therebetween. These return flows of relatively cool fluid 5 in its liquid state cause immediate additional condensation in boilers 7, 7a by chilling the vapors therein thus causing additional return flows of the fluid in its liquid state from bellows 3 to the boilers. In this manner, condensation of vapors in boilers 7, 7a is rather rapid since the return flows of relatively cool fluid 5 from bellows 3 continues to chill vapor in the boilers until boiler 7 refills to its fill level L and boiler 7a is once more refilled with the fluid. As the pressure differentials between boilers 7, 7a and bellows 3 is reduced and eventually eliminated by the return flows of fluid 5 to the boilers, as discussed above, output force F is correspondingly reduced and overcome by resilient forces which may be inherent in driven device 17 as it returns to its original position.

Boilers 7, 7a are illustrated and described herein only for the purposes of disclosure, and it is contemplated that other types of boilers may be utilized in thermal actuator 1 within the scope of the invention and without departing from the teachings thereof. For a more detailed discussion of some of the other types of boilers which may be used in thermal actuator 1 in order to attain different speeds of actuation, time delay and the like, reference may be had to copending applications Ser. Nos. 439,894 and 439,895 filed Feb. 6, 1974 and to copending application Ser. No. 473,764 filed May 28, 1974. These applications are specifically incorporated herein by reference.

The foregoing discussion with respect to the method for operating thermal actuator 1 also embraces another method in one form of the invention for operating the thermal actuator. In this operating method, means, such as bellows 3 and/or driven device 17 for instance, adapted to be operated by vaporizable fluid 5 is supplied with a selected or predetermined volume thereof which is less than that necessary for actuating the operated means, and the selected volume of the vaporizable fluid is then supplemented with that necessary for effecting the operation of the operated means.

More particularly and as previously noted, the predetermined volume of fluid 5 is initially supplied or applied from boiler 7 to bellows 3 upon the energization of PTCR 13 for vaporizing the fluid in the boiler. Such predetermined volume of fluid 5 supplied to bellows 3 initially at least partially operates and prepositions the bellows and driven device 17 but is less than that necessary or required to effect further or final actuation of the driven device. Thereafter, the predetermined volume of fluid 5 supplied to bellows 3 is supplemented by the fluid received from boiler 7a upon energization of PTCR 13a thereby to effect final actuation of driven device 17.

Referring now also to FIG. 2, in the event of the occurrence of a certain condition in electrical system 15, such as low voltage, power loss or droop, or other such emergency which would deleteriously affect equipment (not shown) controlled by the driven device, means, such as a heat sink 19, for rapidly cooling boiler 7 is associated with it upon the occurrence of the aforementioned certain condition, and disassociation of the heat sink and the boiler is prevented prior to the occurrence of another certain condition which may be the opening of a pair of load contacts 61, 63 by driven device 17, for instance to initiate a predetermined time delay before remaking of the load contacts occurs.

More particularly, electrical circuit 15 is provided with a magnatizable or heat sink relay 21 which is connected by its coil 23 across the secondary side of a transformer 25 which has its primary side connected across power terminals L1, L2. Relay 21 may be grounded at 26. When coil 23 is energized, heat sink relay 21 is effective to attract its resilient arm or armature, which constitutes heat sink 19, to a position disengaged from boiler 7. However, in the event of low voltage, power loss or droop, or other such emergency conditions, as previously mentioned, the inherent resiliency of armature 19 carries it into heat conductive engagement, i.e. into association, with boiler 7 for effecting accelerated or rapid cooling thereof, as shown in FIG. 2. Of course, cooling of boiler 7 is effective to deactuate thermal actuator 1 and driven device 17, as previously discussed, to take electrical loads (not shown) which may be controlled or energized by the driven device off the line. The low voltage control of heat sink relay 21 is effected by pre-adjusting the relay to "pick up" arm 19 through actuator 91 which will open contacts 89, 95 and leave hold resistor 27 in series with the relay coil 23. Relay 21 can then be adjusted to "drop out" when a preselected low voltage is reached which is normally a little lower than the pick-up voltage.

Again with reference to the drawings in general, and recapitulating, at least in part, with respect to the foregoing discussion thermal actuator in one form of the invention has means, such as bellows 3, for performing work in response to vaporizable fluid 5 applied thereto (FIGS. 1 and 2). A pair of means, such as boilers 7, 7a, for containing fluid 5 are operable generally sequentially to respectively apply at least a portion of the fluid contained therein to performing means or bellows 3 to effect the work thereof.

More particularly and with reference again to FIG. 1, boilers 7, 7a are formed of a metal having relatively great heat conduction or heat transfer characteristics, as is well known in the art, and are provided with annular side wall 29, 29a which tapers to define apertures 31, 31a in the lower end of the boilers. Upper or top ends 33, 33a of boilers 7, 7a are integrally formed with side walls 29, 29a, and the boilers may preferably present a relatively small thermal masses compared to the relatively great cooling or surface areas thereof. PTCR 13 and PTCR 13a are disposed in heat transfer relation with boiler top ends 33, 33a, and each PTCR is shown mounted directly in heat conductive association with the boilers.

Conduits 9, 9a are provided with passages (not shown) there through communicating between boilers 7, 7a and bellows 3 and the conduits are formed just large enough to allow ready equalization of pressure and small enough to minimize conduction of heat between the boilers and bellows. Preferably conduits 9, 9a are formed of a metal having relatively low thermal conductive properties. Conduits 9, 9a are fixedly and sealably received with boiler apertures 31, 31a by suitable means, such as crimping as shown or else by soldering or welding for instance. As previously noted, upper end portion 11 of conduit 9 extends into boiler 7 a predetermined distance while upper end portion 11a of conduit 9a terminates generally at the lower end of boiler 7a. Conduits 9, 9a extend through a metallic support or frame 35 for thermal actuator 1 communicating with an expansible chamber 37 of bellows 3, and the conduits are fixedly and sealably connected with the frame by suitable means such as crimping as shown or also by soldering or welding. Frame 35 may be grounded at 36.

Bellows 3 is provided with a lower end wall 39 for delivering its work, i.e. its movement, through a connecting link or abutment 41 to driven device 17. An annular expansible resilient member 43 of relatively low positive gradient spring rate is fixedly and sealably interposed by suitable means, such as soldering or welding (not shown) between bellows end wall 39 and frame 35 thereby to define expensible chamber 37 within bellows 3.

There is shown in general at 45 an actuating system in one form of the invention having driven device 17 and means, such as bellows 3, responsive to vaporizable fluid 5 applied thereto for driving the driven device. A pair of means, such as boilers 7, 7a, are operable generally for applying vaporizable fluid 5 to the bellows to effect its driving of driven device 17.

More particularly, driven device 17 is constituted by a load relay having a toggle spring 47 biased between a pair of pivoted relay arms or members 49, 51. As well known in the art, toggle spring 47 is provided with a negative spring gradient so as to afford snap-action to driven device 17 upon the movement thereof between opposite operable positions. The resiliency of arm 49 may be considered in conjunction with that of toggle spring 47 to form the negative spring gradient. These opposite operable positions are defined by a pair of opposite stops or abutments 53, 55 for motion limiting engagement with relay arm 49 which extends therebetween. Relay arm 49 is connected by suitable means, indicated at 57 by the dotted line, to a contact blade 59 for moving a movable contact 61 thereon into making and breaking engagement with a stationary contact 63 adapted for connection with at least one electrically controlled load device (not shown). In order to permit bellows 3 to move against a reasonably high force with reasonably high internal pressures while fluid 5 is being vaporized from boiler 7, a pre-load spring 64 may be interposed between bellows 3 and operating arm 49. Fluid 5 of boiler 7 should not be enough to deflect bellows 3 to engage link 41, but should be sufficient to afford the time delay, i.e., time to vaporize and transfer all of the fluid from boiler 7. Fluid 5 in boiler 7a should then be sufficient to further deflect bellows 3 to engage link 41 and force relay arm 49 into its operable position. Upon de-energization, spring 64 will cause the complete collapse of the bellows 43, thus restoring the initial quantity of liquid to boilers 5, 5a.

Referring now again in general to FIG. 2, another actuating system 65 in one form of the invention is shown having thermal actuator 1 therein with means, such as boiler 7, for containing vaporizable fluid 5 which is adapted to be heated and cooled to effect actuation of the thermal actuator. Means, such as heat sink relay aramature 19, is provided for effecting rapid cooling of boiler 7. Means, such as heat sink relay 21, is operative generally to associate its armature 19 and the boiler 7 to accelerate cooling thereof upon the occurrence of a certain condition. Such certain conditions may be loss of and quick restoration of power in a load circuit (not shown) controlled by electrical circuit 15. Of course, such certain conditions would deleteriously affect actuation of the controlled load circuit and would be reflected in electrical circuit 15. Means, such as holding resistor 27, is also provided for preventing disassociation of relay armature 19 and boiler 7 by establishing a low voltage control of heat sink relay 21 which would operate upon the occurrence of another certain condition, such as a low voltage condition of a predetermined low value in the load circuit and thus in electrical circuit 15.

More particularly, the primary side of transformer 25 is connected across power terminals L1, L2 in electrical circuit 15. The secondary side of transformer 25 is connected through means, such as a thermostat 67, for selectively applying power upon the occurrence of a preselected or certain condition. This condition may be the sensing by thermostat 67 of a selected high ambient temperature. Means, such as an electrical switch or the like indicated generally at 69, is also provided for applying power to energize PTCR 13 to effect heating of boiler 7 vaporizing fluid 5 therein. Switch 69 is provided with a current carrying switch arm or blade 71 connected with PTCR 13 and carrying a movable or double contact 73. Movable contact 73 is adapted to be switched between a pair of stationary contacts 75, 77 by a driving link or connection, indicated by dotted line 79, in response to movement of relay arm 49 between its stops 53, 55. Stationary contact 75 is disposed in series circuit relation between thermostat 67 and PTCR 13, and stationary contact 77 is disposed in series circuit relation with PTCR 13 being connected with the secondary side of transformer 25. As shown in FIG. 2, relay 17 normally urges switch blade 71 toward a position engaging movable contact 73 with stationary contact 77 thereby to complete the circuit for energizing PTCR 13 causing heating of boiler 7 to vaporize fluid 5 therein. Of course, when relay 17 is operated and thermostat 67 is open, then both PTCR 13 and PTCR 13a are de-energized.

An energizing circuit, indicated generally at 81, is provided for operating heat sink relay 21 and is connected across the secondary side of transformer 25 at circuit terminals 83, 85, as discussed hereinafter. Coil 23 of heat sink relay 21 has one end thereof connected to circuit terminal 83 while the other end thereof is connected with a current carrying switch blade 87 having a movable contact 89 thereon. Armature 19 of heat sink relay 21 and switch blade 87 are mechanically linked at 91 for conjoint movement, and another moveable contact 93 is provided on the heat sink relay armature. Contact 89 on switch blade 87 and contact 93 on aramature 19 of heat sink relay 21 are adapted for circuit making and breaking engagement with a stationary double contact 95 interposed therebetween. Switch blade 87 is connected with the other end of coil 23 of heat sink relay 21, and stationary double contact 95 is connected by a lead 97 with circuit terminal 85. As previously mentioned, heat sink relay 21 is connected across the secondary side of transformer 25 by the connection of one side of coil 23 with circuit terminal 83, and the other side of the heat sink relay coil is connected through engagement of contacts 89, 95 and the connection of lead 97 with circuit terminal 85. Contacts 93, 95 complete the circuit to transformer terminal 85 from terminal 83 through PTCR 13, 13a through ground 36 to ground 26 and through arm 19 to energize PTCR 13, 13a.

As previously noted, means, such as heat sink relay 21, is operable generally, i.e. drops out, in the event of loss of at least a predetermined amount of power (or a low voltage condition) in electrical circuit 15 for associating cooling accelerating means, such as heat sink relay aramture 19, with boiler 7. Further, means, such as holding resistor 27, is provided for preventing operation, i.e. the drop out, of heat sink relay 21 to effect disassociation of relay aramture 19 and boiler 7 until the power in electrical circuit 15 attains a predetermined low value. To complete the description of circuit 15, holding resistor 27 is connected in parallel circuit relation between heat sink relay coil 23 and lead 97 across contacts 89, 95.

OPERATION

In the operation, it may be noted that when movable contact 73 of switch 69 is in making engagement with stationary contact 77 power is applied from transformer 25 through the switch to PTCR 13 for effecting its energization. Upon such energization, PTCR 13 is operable generally to quickly heat boiler 7 and fluid 5 therein to a temperature at least great enough to effect vaporization of the fluid. As the vaporization of fluid 5 in boiler 7 is effected, a pressure differential is created between the boiler and bellows 3. This pressure differential is effective to displace vaporized fluid 5 from boiler 7 through conduit 9 toward expansible chamber 37 of bellows 3. As vaporized fluid 5 approaches the generally cooler environs of bellows 3, the vaporized fluid condenses thereby to revert to its liquid state. It may be noted that generally the entire predetermined volume or amount of fluid 5 is so transmitted to bellow 3. Even though boiler 7 may be devoid of fluid in its liquid state, PTCR 13 continues to be energized thereby to maintain the aforementioned pressure differential. Upon such initial delivery or transmission to expansible chamber 37 of bellows 3 of the predetermined volume of fluid 5, it acts on the effective area of the bellows to accomplish work, i.e. movement of the bellows in response to the establishment of output or working force F which acts against preload spring 64. As will be recalled, the volume of fluid 5 in boiler 7 is not great enough to deflect bellows 3 for engaging link 41 but is sufficient to afford a predetermined time delay, i.e. the time to vaporize and transfer all of the liquid from the boiler 7. It may be noted that the volume of fluid which may be transferred from boiler 7 to bellows 3 is predetermined so as to establish output force F at a value predeterminately less than that necessary or required to actuate load relay 17. In this manner, load relay 17 may be initially partially actuated or operated and moved to a poised position by the initially established output force F and movement of bellows 3 wherein only a slight increase of the output force is necessary to effect actuation of the load relay.

Thermostat 67 is operable generally in response to a certain or preselected condition, such as its sensing a selected high temperature in its environment, to effect the application of power from transformer 25 to PTCR 13a for energizing it. Upon such energizations, PTCR 13a is operable generally to quickly heat boiler 7a and fluid 5 therein to a temperature at least great enough to effect vaporization of the fluid. As the vaporization of fluid 5 in boiler 7a is effected a pressure differential is created between the boiler and bellows 3. The vaporized fluid 5 so established acts in the effective area of the remaining fluid in its liquid state in boiler 7a to effect the displacement or transfer of at least part of the fluid in its liquid state through conduit 9a into expansible chamber 39 of bellows 3. The pressure of fluid 5 in its liquid state so displaced from boiler 7a is supplemental or additive to that pressure already established in bellows 3 to increase the value of output force F to at least the aforementioned predetermined value necessary to deflect or move bellows 3 into engagement with link 41 for effecting actuation of load relay 17 from its poised poisition. In other words, the final work accomplished by bellows 3 effects further or final actuation or operation of load relay 17.

Upon such final actuation of load relay 17, pivotal member 49 is pivoted downwardly or generally in a clockwise direction against the opposing force of toggle spring 47 into motion limiting engagement with lower stop 55. Actuation of relay 17 and pivotal member 49 in this manner drives link 57 to move blade 59 and urge movable contact 61 into circuit making engagement with stationary contact 63 for energizing components in the load circuit (not shown) controlled by electrical circuit 15, such as those which may controllably drive a compressor for instance. The pivotal movement of member 49 of load relay 17 is also effective through link 79 to move blade 71 of switch 69 generally downwardly or in a clockwise direction into circuit making engagement with stationary contact 75. It may be noted that the engagement of movable and stationary contacts 73, 75 now places both PTCR 13 and PTCR 13a in series circuit relation with transformer 25 through thermostat 67.

When switch contacts 73, 75 are so engaged, thermostat 67 may also be operable upon the occurrence of another certain or selected condition to interrupt the application of power to PTCR 13 and PTCR 13a. For instance, if thermostat 67 senses a selected low temperature, which may constitute the above mentioned other certain condition, then the thermostat will open interrupting the application of power therethrough from transformer 25 to PTCR 13 and PTCR 13 thereby to de-energize them. De-energization of PTCR 13 and PTCR 13a effects cooling of boilers 7, 7a creating pressure differentials between them and bellows 3 for effecting a return flow of displaced fluid 5.

As boilers 7, 7a begin to cool, slight amounts of vaporized fluid 5 therein condense which results in slight decreases in the pressure differentials previously created between the boilers and bellows 3. Upon such slight decreases in pressure in boilers 7, 7a, relatively cooler fluid 5 in its liquid state flows from bellows 3 through conduits 9, 9a returning to the boilers. This return flow of relatively cool fluid 5 in its liquid state causes immediate additional condensation in boilers 7, 7a by chilling vaporized fluid therein thus causing more of the fluid to return from bellows 3 to the boilers. In this manner, condensation of vaporized fluid 5 in boilers 7, 7a is rather rapid since the return flows or relatively cool fluid 5 in its liquid state from bellows 3 continues to chill the vaporized fluids in the boilers until the boilers are refilled with fluid in its liquid state. Of course, boiler 7 will be refilled to its fluid level L, and boiler 7a will be generally completely filled. As the pressures in boilers 7, 7a are so reduced by the return flows of fluid 5 in its liquid state, the pressure differentials between the boilers and bellows 3 are correspondingly reduced and eventually eliminated upon the refilling of the boilers with the fluid. Output force F is correspondingly reduced along with the pressure differentials and eventually overcome by the opposing forces of toggle spring 47 and return spring 64 permitting the return of bellows 3 and and the components of load relay 17 to their original position in a sequence generally reverse to that effected during action or energization of load relay 17. Upon return of the components of load relay 17 to their original operable position, pivotal member 49 moves generally upwardly in a counterclockwise direction to re-engage upper stop 53, and link 57 drives blade 59 to return movable contact 61 to its circuit breaking position disengaged from stationary contact 63. The return movement of relay pivotal member 49 also drives link 79 to move blade 71 of switch 69 from its position engaging movable and stationary contacts 73, 75 back to its original position re-engaging the movable contact with stationary contact 77. In this manner, the re-engagement of movable and stationary contacts 73, 77 of switch 69 once again effects the application of power through the switch from transformer 25 to PTCR 13. With power once more applied to PTCR 13, it is re-energized to heat boiler 7 and again initiate the heating cycle of electrical circuit 15 and thermal actuator 1, as previously discussed.

In emergency circuit 81, when power is initially applied across transformer 25, it is also applied across relay 21 from terminal 85 through contacts 89, 95 to terminal 85. If the applied voltage is above a predetermined low value, relay 21 will energize or pick-up, but it may be noted that none of the other circuit portions of electrical circuit 15 is energized until the relay picks-up. When relay 21 picks-up, armature 19 thereof is attracted into magnetic holding engagement with the relay thereby to be displaced or disassociated from boiler 7. Upon such magnetic attraction of armature 19, contact 93 is moved into engagement with stationary double contact 95 for circuit completion through PTCR 13 and PTCR 13a to ground at 36, 26 and link 91 is driven by the armature to disengage movable contact 89 on blade 87 from the stationary double contact. The power applied to relay coil 23 is reduced upon the disengagement of movable contact 89 and stationary double contact 95 which places hold resistor 27 in series circuit relation with the relay coil. Hold resistor 27 is generally operable to hold armature 19 in its position disengaged from boiler 7 until the applied voltage is reduced to a predetermined low value less than that required or necessary for effecting the magnetic attraction of armature 19 into holding engagement with its heat sink relay 21.

At that time contacts 93, 95 make to effect energization of PTCR 13 for transferring its fluid, a time delay to move bellows 3 to its poised or partially operated position is effected since only vaporized fluid is transferred, as previously described. The magnitude of the time delay is a function of the power for energizing PTCR 13, the latent heat of vaporization of the particular fluid 5 utilized, the quantity of fluid so transferred, and the pressure at which such transfer of fluid is effected.

In the event of a power loss or a reduction of voltage in electrical circuit 15 to the aforementioned predetermined low value which effects a low voltage condition in the load circuit (not shown) controlled by electrical current 15, of course, the load controlled by relay 17 could be deleteriously affected, as previously mentioned. Upon the occurrence of this certain condition or voltage reduction in electrical circuit 15, the magnetic holding engagement of relay 21 with its armature 19 is interrupted. In this manner, armature 19 is permitted to move into engagement or association with boiler 7, and PTCR 13 and PTCR 13a will be de-energized when contacts 93, 95 break. Of course, when relay 21 sets or is so de-energized, the components of electrical circuit 15 return to their original position. When engaged with boiler 7, armature 19 acts as a heat sink to effect rapid or accelerated cooling of the boiler. This acceleration of the cooling rate of boiler 7 effects a faster return flow of fluid 5 thereto, as previously described, and load relay 17 is, of course, more quickly de-actuated for removing the load components (not shown) operated thereby from the line. Naturally, the more quickly the load components controlled by load relay 17 can be removed from the line, as discussed above, the less damage will be occasioned by the load components because of low voltage conditions or the subsequent re-energization of a stalled load component. In general, it is apparent from the foregoing that thermal actuator 1 may be generally cyclically operable, and means, such as heat sink armature 19, may be associated with means, such as boiler 7, for rapidly cooling it upon the occurrence of a certain condition, such as low circuit voltage as discussed above, which may require relatively quick recycling operation of the thermal actuator. The rapidly cooling means or armature 19 is prevented from disassociation from boiler 7 prior to the occurrence of another certain condition which may be the re-establishment of the circuit voltage.

Figure 3:
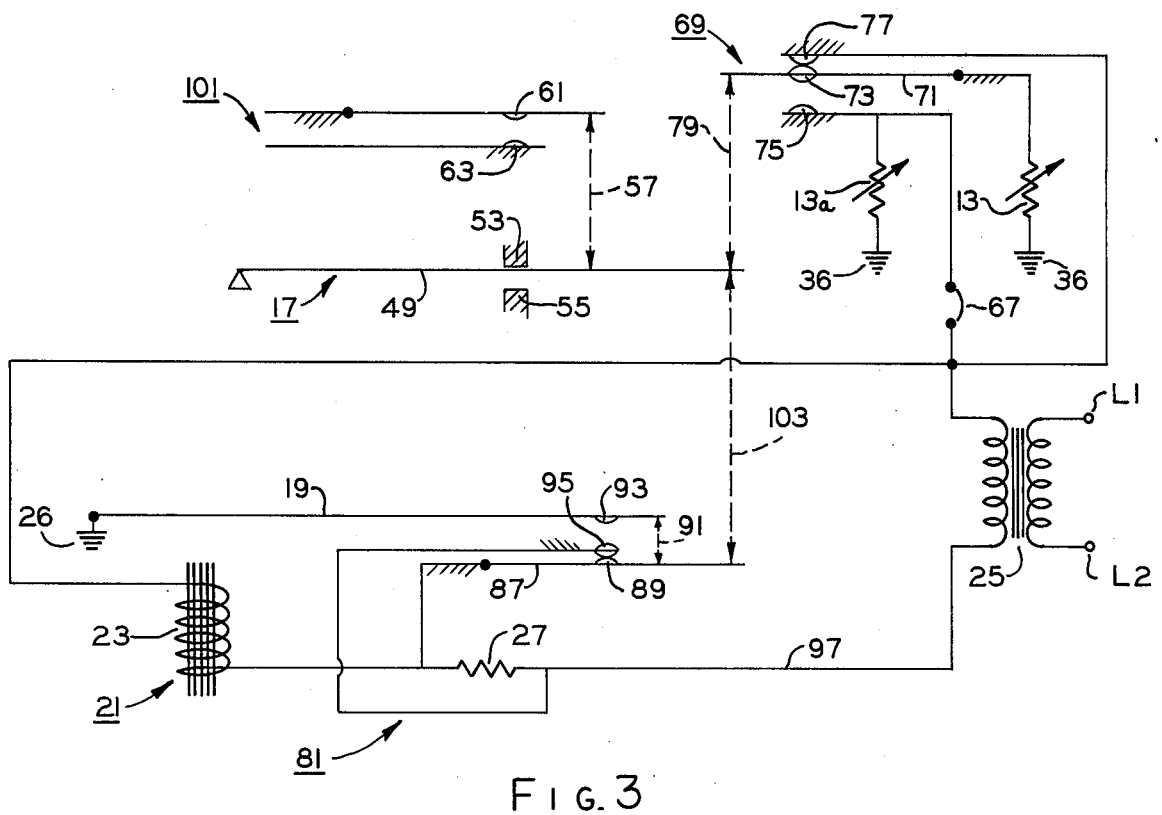
FIGS. 3 and 4 are schematic views illustrating alternative electrical circuits and actuating systems for operating the thermal actuator of FIG. 1, each illustrating one form of the invention.

Referring now to FIG. 3, an alternative electrical circuit 101 in one form of the invention is provided having generally the same components and functioning generally in the same manner as electrical circuit 15. However, it may be noted that electrical circuit 101 may have at least some salient features, as discussed hereinafter, different from those of electrical circuit 15.

In electrical circuit 101, a link or actuator 103 is drivingly engaged between arm 49 of load relay 17 and blade 87. The purpose of link 103 is to keep contacts 89, 95 open until relay 17 has reset, thus effecting a time delay before relay 17 can again be operated, as discussed below. During the aforementioned certain emergency conditions of power loss or voltage reduction, heat sink relay 21 is dropped-out or de-energized permitting its armature 19 to move into heat sink association with boiler 7, as previously mentioned. However, the interlock established by link 103 will prevent contact 89 on blade 87 from re-engaging stationary double contact 95 as armature 19 is moved into heat sink association with boiler 7, and these contacts will re-enegage only upon the resetting or movement of load relay arm 49 back to its original position in engagement with its stop 53. In this manner, it may be noted that link 103 between load relay arm 49 and blade 87 prevents operation of heat sink relay 21 from attracting its armature 19 to its position disassociated from boiler 7 and re-energizing PTCR 13 and PTCR 13a through contacts 93, 95 until load contacts 61, 63 are disengaged in response to resetting of load relay 17. Thus, a time delay is provided defining a period of time before heat sink relay 21 can be re-energized to again effect the heating cycle of thermal actuator 1. This time delay protects the load components (not shown) controlled by load relay 17, such as for instance a compressor motor that might stall if power was immediately re-applied thereto after its compressor stops, it being assumed that the low voltage condition causing heat sink relay 21 to drop-out would also cause the compressor to stop.

Figure 4:
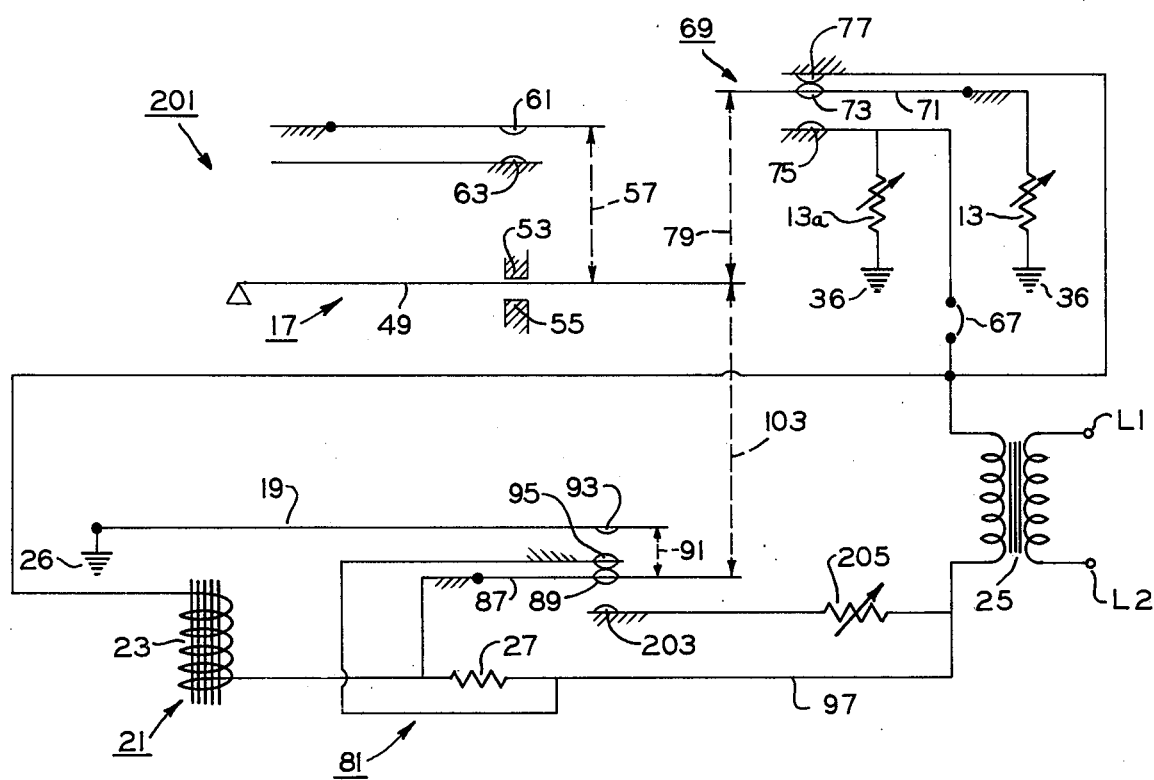

Referring now to FIG. 4, an alternative electrical circuit 201 in one form of the invention is provided having generally the same components and functioning generally in the same manner as previously described electrical circuit 101. However, it may be noted that electrical circuit 201 may have at least some salient or advantageous features, as discussed hereinafter, different from those of electrical circuit 101.

In electrical circuit 201, another stationary contact 203 is provided for making and breaking engagement with movable contact 89. Another positive temperature coefficient resistor (PTCR) 205 is connected in series circuit relation with contact 203, and both contact 203 and PTCR 205 are connected in parallel circuit relation with hold resistor 27. When heat sink relay 21 is energized to attract its armature 19 into magnetic holding engagement in the position disassociated from boiler 7, link 91 drives blade 87 to a position breaking its contacts 89 from stationary double contact 95 thereby to place hold resistor 27 in circuit, as previously described. However, contact 89 is not moved into making engagement with contact 203 until load relay 17 is operated by thermal actuator 1 moving load relay arm 49 to its operable position in engagement with its stop 55. Upon making engagement of contact 89 with contact 203, PTCR 205 is energized and connected in parallel circuit relation with with hold resistor 27. In this manner, the aforementioned predetermined low value of voltage for occasioning the drop-out of heat sink relay 21 is further predeterminately decreased for a period of time until the PTCR 205 heats up and greatly increases its resistance. Thus PTCR 205 may be used as a variable resistor and must have a time constant consistent with the period of time or time delay requird. This time delay may be desirable in certain controlling operations, such as for instance to permit a compressor motor (not shown) to depress line voltage due to high current starting characteristics without causing electrical circuit 201 to oscillate, i.e. causing relay 21 to drop-out and start a new timing cycle. In other words, after a short period of time, PTCR 205 self-heats to increase its resistance so as to re-establish the drop-out voltage of heat sink relay 21 to or very near its original drop-out voltage condition. PTCR 205 should be provided with enough time to cool with respect to the heating and cooling cycle of thermal actuator 1.

From the foregoing it is now apparent that a novel thermal actuator 1, novel methods of actuating a thermal actuator, novel actuating systems 45, 65 for a thermal actuator, and novel electrical circuits 15, 101, 201 for operating a thermal actuator are provided meeting the objects and advantageous features set out hereinbefore, as well as others. It is contemplated that changes as to the precise configurations, shapes, details, connections and arrangements of the structure and also the precise steps of the methods, which are presented merely to disclose and illustrate the invention, may be made by those having ordinary skill in the art without departing from the spirit and scope of the invention as set out by the claims which follow.

What I claim as new and desire to secure by Letters Patent of the United States is:

1. A thermal actuator comprising means for performing work in response to a vaporizable fluid applied thereto, and a pair of means for containing the vaporizable fluid and operable generally sequentially to respectively apply at least a portion of the vaporizable fluid contained therein to the performing means to effect the work thereof, the application of the vaporizable fluid from one of the containing means to the performing means being effective to establish the work thereof at an amount less than a predetermined value and the application of the vaporizable fluid from the other of the containing means to the performing means being effective to increase the work thereof to an amount at least as great as the predetermined value.

2. A thermal actuator as set forth in claim 1, wherein the one containing means is operable generally to apply a larger volume of the vaporizable fluid to the performing means than the other containing means.

3. A thermal actuator as set forth in claim 1, wherein the one containing means is operable generally to apply its entire amount of vaporizable fluid to the performing means.

4. A thermal actuator as set forth in claim 1, wherein the one containing means is operable generally to apply its entire volume of vaporizable fluid to the performing means and the other containing means is subsequently operable generally to apply at least a portion of its volume of vaporizable fluid to the performing means.

5. A thermal actuator as set forth in claim 1, further comprising a pair of means for respectively heating the containing means to vaporize at least a portion of their vaporizable fluids for effecting the applications thereof to the performing means.

6. A thermal actuator as set forth in claim 1, further comprising a pair of means for respectively communicating the containing means with the performing means.

7. A thermal actuator as set forth in claim 1, wherein the performing means comprises means for expansion upon theh application of the vaporizable fluids thereto.

8. A thermal actuator as set forth in claim 1, wherein the containing means comprise a pair of boilers adapted to be respectively heated for vaporizing at least some of the fluid therein and effecting the applications of the fluid to the performing means.

9. A thermal actuator comprising a pair of boilers for a vaporizable fluid, one of the boilers being adapted to contain a predetermined volume of the fluid and the other of the boilers being adapted to contain a volume of the fluid less than the predetermined volume, a bellows operable generally for performing work, an expansible chamber within the bellows for the fluid, a pair of conduits respectively interconnected between the boilers and the expansible chamber for transferring the fluid therebetween, and a pair of heaters disposed in heat transfer relation with the boilers and adapted to be energized upon the occurrence of certain conditions for heating the boilers to at least the vaporization temperature of the fluid, respectively, one of the heaters being energized upon the occurrence of one of the certain conditions to heat the one boiler vaporizing generally the entire predetermined volume of the fluid therein and effecting the transfer thereof through one of the conduits into the expansible chamber for operating the bellows to effect the work thereof, and the other of the heaters being subsequently energized upon the occurrence of another of the certain conditions to heat the other boiler vaporizing at least a portion of the fluid therein and effecting the transfer of at least another portion of the fluid therefrom through the other of the conduits into the expansible chamber for further operating the bellows to increase the work thereof.

10. A method of operating a thermal actuator comprising the steps of:
   a. actuating partially means adapted to be operated by a vaporizable fluid so as to transmit an output force by applying the fluid under a first pressure from a source thereof to act on the operated means and establish the output force at a value less than a predetermined value; and
   b. completing the actuation of the operated means by applying the fluid under a second pressure from another source thereof to act on the operated means and supplementing the first pressure with the second pressure to increase the output force to a value at least as great as the predetermined value.

11. The method as set forth in claim 10, comprising the preliminary step of vaporizing the fluid at the first named source to establish the first pressure for applying the fluid to the operated means during the actuating step.

12. The method as set forth in claim 10, wherein generally the entire volume of the fluid at the first named source is vaporized for application to the operated means.

13. The method as set forth in claim 10, comprising the intermediate step of vaporizing the fluid at the other source to establish the second pressure for applying the fluid to the operated means during the completing step.

14. The method as set forth in claim 13, wherein only a portion of the volume of fluid is vaporized at other source.

15. The method as set forth in claim 10, comprising the preliminary step of associating with the first named source and the other source a pair of means operable generally in an energized state for respectively heating the first named source and the other source at least to a temperature for vaporizing the fluid therein to effect the applications of the fluid to the operated means during the actuating step and the completing step, respectively.

16. The method as set forth in claim 15, comprising the additional step of engaging one of the first named source and the other source with means for accelerating the cooling thereof upon the occurrence of a certain condition reverting at least one of the heating means to a de-energized state and terminating the heating thereby of the one of the first named source and the other source.

17. The method as set forth in claim 16, comprising the further additional step of preventing re-energization of the at least one heating means prior to the occurrence of another certain condition.

18. The method as set forth in claim 16, comprising the further additional step of preventing the disengagement of the cooling accelerating means and the one of the first named source and the other source prior to the occurrence of another certain condition.

19. The method as set forth in claim 10, comprising the preliminary step of providing generally open vaporizable fluid communication between both the first named source and the other source with the operated means.

20. The method as set forth in claim 10, comprising the preliminary step of connecting the operated means in driving engagement with a driven device for controlling its actuation.

21. A method of operating a thermal actuator having a vaporizable fluid therein comprising the steps of:
  a. communicating the fluid in each of a pair of supply means therefor with the fluid in means adapted to be operated thereby;
  b. supplying to the operated means an initial selected volume of the fluid from one of the supply means less than that necessary for effecting the complete operation of the operated means; and
  c. supplementing the initial selected volume of the fluid supplied to the operated means with an additional volume of the fluid from the other of the supply means to the operated means and at least great enough for effecting the completion of the operation of the operated means.

22. The method as set forth in claim 21, wherein the supplying step includes heating the one supply means for vaporizing at least a portion of the vaporizable fluid to effect the supply of the selected volume thereof to the operated means.

23. The method as set forth in claim 21, comprising the intermediate step of heating the other supply means for vaporizing at least a portion of the fluid therein to effect the supply of the additional volume of the fluid to the operated means.

24. The method as set forth in claim 21, comprising the preliminary step of associating with the operated means means adapted to be conjointly driven therewith for controlling a circuit.

25. An actuating system comprising a driven device adapted to be sequentially driven from a generally at-rest position to a poised position and therefrom toward a completely actuated position, means responsive to a vaporizable fluid applied thereto for driving the driven device, and a pair of means having the fluid therein connected in generally open fuid communication with the driving means and operable generally sequentially for applying the fluid to the driving means to effect its actuation and its driving of the driven device, the driving means being responsive to the fluid initially applied thereto from one of the applying means to drive the driven means between its generally at-rest position and its poised position and the driving means being thereafter further responsive to the fluid applied thereto from the other of the applying means to drive the driven means from its poised position at least to its completely actuated position.

26. An actuating system as set forth in claim 25, wherein the one applying means contains a predetermined volume of the fluid which is greater than that contained in the other applying means.

27. An actuating system as set forth in claim 25, further comprising a pair of means for respectively heating the applying means to vaporize at least a portion of the fluid therein for effecting the respective applications of fluid to the driving means.

28. An actuating system as set forth in claim 27, further comprising means for effecting energization of one of the heating means prior to the other thereof to effect the application of the fluid from the one applying means to the driving means for only partially actuating it so as to drive the driving means only to its poised position, the other of the heating means being subsequently energized by the energization effecting means to also effect the application of the fluid from the other applying means to the driving means for completing the actuation thereof so as to drive the driven means to its at least completely actuated position.

29. An actuating system as set forth in claim 28, further comprising means for association with one of the one and other applying means to effect rapid cooling thereof upon the occurrence of a certain condition interrupting the energization of the heating means by the energization effecting means.

30. An actuating system as set forth in claim 29, further comprising means operable generally upon the association of the association means and the one of the one and other applying means for preventing disassociation thereof prior to the occurrence of another certain condition.

31. An actuating system as set forth in claim 29, further comprising means responsive to another certain condition for maintaining the association means disassociated from the one of the one and other applying means.

32. An actuating system as set forth in claim 29, wherein the driven device is deactuated along with the driving means upon the cooling of at least the one of the one and other applying means, and further comprising means for predeterminately delaying the association of the association means with the one of the one and other applying means upon the occurrence of the certain conditions.

33. An actuating system as set forth in claim 31, wherein the maintaining means is voltage responsive and the other certain condition constitutes a predetermined voltage value, and means operable generally through a predetermined period of time for decreasing the voltage level required for energizing the maintaining means to disassociate the association means from the one applying means upon the occurrence of the other certain condition.

34. An actuating system as set forth in claim 25, further comprising a pair of means for resspectively conducting the fluid from the applying means to the driven means.

35. An actuating system comprising a device adapted to be driven to an actuated position, and a thermal actuator containing a vaporizable fluid including means operable generally to perform work for driving the driven device, means for effecting partial operation of the driving means to initially perform its work in an amount less than a predetermined value to effect at least a partial driving of the driven device toward its actuated position, and means for effecting supplemental work by the driving means in an amount which when additive to its initial work is at least as great as the predetermined value to complete the driving of the driven device to the actuated position thereof.

36. An actuating system as set forth in claim 35, wherein the partial operation effecting means comprises means operable generally for vaporizing the fluid therein and applying it to the driving means to establish its initial work.

37. An actuating system as set forth in claim 36, wherein the vaporizing means includes a boiler containing the fluid, and means for heating the boiler to a temperature at least great enough to vaporize the fluid.

38. An actuating system as set forth in claim 35, wherein the supplemental work effecting means comprises means operable generally for vaporizing at least a portion of the fluid therein to effect the application of fluid to the driving means and establish the supplemental amount of work.

39. An actuating system as set forth in claim 38, wherein the supplemental work effecting means includes a boiler containing the fluid, and means for heating the boiler to a temperature at least great enough to vaporize the fluid.

40. An actuating system as set forth in claim 35, wherein the thermal actuator further includes means for respectively communicating the partial operation effecting means and the supplemental work effecting means with the driving means.

41. An actuating system as set forth in claim 35, wherein the driving means comprises means adapted to be expansible in response to the pressures established in response to the fluid applied thereto by the partial operation effecting means and the supplemental work effecting means so as to effect the driving of the driven device.

42. An actuating system as set forth in claim 35, further comprising means for effecting actuation of the partial operation effecting means prior to actuation of the supplemental work effecting means.

43. An electrical circuit for controlling a pair of heaters for effecting heating and cooling of a pair of boilers for vaporized fluid in a thermal actuator comprising means for applying power to energize one of the heaters for heating one of the boilers and vaporizing the fluid therein, means for applying power to energize the other of the heaters for heating the other of the boilers and vaporizing the fluid therein upon the occurrence of a certain condition, and means operable generally in response to the vaporization of the fluids in the first named and other boilers for switching the first named power applying means into series circuit relation with the second named power applying means, the second named power applying means also being operable upon the occurrence of another certain condition to interrupt the energization of the heaters thereby to effect cooling of the boilers.

44. An electrical circuit as set forth in claim 43, further comprising means for accelerating cooling of one of the one and other boilers, and means operable generally in the event of a reduction of at least a predetermined amount of voltage in the electrical circuit for associating the cooling accelerating means with the one of the one and othere boilers.

45. An electrical circuit as set forth in claim 44, further comprising means for preventing operation of the associating means to effect disassociation of the cooling accelerating means and the one of the one and other boilers until the voltage in the electrical circuit attains a predetermined value.

46. A thermal actuator comprising means for performing work in response to a vaporizable fluid applied thereto, and a pair of means for containing the vaporizable fluid and operable generally sequentially to respectively apply the vaporizable fluid to the performing means to effect the work thereof, one of the containing means being operable generally to apply its entire volume of the vaporizable fluid to the performing means to establish the work thereof at an amount less than a predetermined value and the other of the containing means being subsequently operable generally to apply at least a portion of its volume of the vaporizable fluid to the performing means to increase the work thereof to an amount at least as great as the predetermined value.

47. A thermal actuator as set forth in claim 46, wherein the volume of the one containing means in greater than that of the other containing means.

48. A thermal actuator as set forth in claim 46, further comprising a pair of means for heating the containing means to effect the applications of the fluids thereof to the performing means, respectively.

49. A thermal actuator as set forth in claim 48, wherein a pair of positive temperature coefficient resistors thermally coupled to the containing means generally constitute the heating means.

50. A thermal actuator as set forth in claim 46, wherein the containing means comprise a pair of boilers adapted to be respectively heated for vaporizing the fluid therein, the generally entire volume of the fluid in one of the boilers being vaporized in response to the heating thereof and applied to the performing means and at least a portion of the fluid in the other of the boilers being vaporized upon the heating thereof to effect the application of the at least a portion of the remaining fluid therein to the performing means.

* * * * *